Patented Dec. 31, 1935

2,025,791

UNITED STATES PATENT OFFICE 2,025,791

PRODUCTION OF DERIVATIVES OF AN ORTHO CYANO-ARYL AMIDE

Jocelyn Field Thorpe and Reginald Patrick Linstead, South Kensington, London, England, and John Thomas, Kingarth, Polmont, Scotland, assignors to Imperial Chemical Industries Ltd., a corporation of Great Britain No Drawing. Application December 4, 1930, Serial No. 500,138. In Great Britain December 13, 1929

3 Claims. (Cl. 260—47)

This invention relates to derivatives of an o-cyano-aryl amide mainly for use as colouring matters and dyestuffs, and has for its object the preparation of such products.

The invention consists in heating a metal or metal compound with o-cyano-benzamide or similar bodies. The metal may for instance be iron in the form of filings, and the starting materials may be o-cyanobenzamide, o-cyanoamides of naphthalene, substituted o-cyanoamides of benzene and bodies which give these o-cyanoamides in the course of reaction. These compounds may all be represented by the formula

wherein R represents a benzene or naphthalene residue, the —CN and the —CO—NH$_2$ groups being ortho to each other.

The process preferably consists in heating the cyanoamide and the metal at high temperatures either alone or in the presence of suitable diluents or solvents followed where necessary by treatment for purification, for example, for the removal of any excess metal.

The foregoing process works very smoothly and gives good yields, and the products obtained may be used as colouring matters, for example, on similar lines to those described in British Patent No. 322,169, accepted November 18, 1929.

Considerable heat may be developed in the reaction between cyanobenzamide and the metal, especially with magnesium, and provision for this may be necessary when operating on a large scale.

The following examples illustrate how the invention may be carried into effect, reference to parts being to parts by weight:—

Example 1

This describes the production of phthalimide, an intermediate product for the production of o-cyanobenzamide.

2000 parts of phthalimide are covered with 5280 parts of aqueous ammonia, (with a specific gravity of 0.880), and allowed to stand for two days. The diamide remains as a fine white crystalline powder, and is filtered and dried at 100° C. The yield is about 200 parts, the product melting at 220° C. with decomposition.

Instead of allowing the ammonia to stand on the phthalimide, the reaction can be carried out with stirring. It will also have the effect of quickening it.

Example 2

This describes the conversion of phthalimide to o-cyanobenzamide.

162 parts of the phthalimide are mixed with 590 parts of acetic anhydride, and the mixture is heated to boiling as quickly as possible, vigorous boiling under reflux being continued until the solution is clear, which may take about 80 minutes. The liquid is then set aside to cool. The o-cyanobenzamide which separates is filtered off, washed first with glacial acetic acid, then with alcohol, and dried at 100° C.

Example 3

This describes the treatment of the o-cyanobenzamide with iron filings.

40 parts of o-cyanobenzamide and 16 parts of iron filings are intimately mixed and heated in an oil bath. The temperature is measured by two thermometers, one in the mixture and one in the heating medium. The temperature of the mixture is raised to 240° C. and maintained between 235° C. and 245° C. for three quarters of an hour. The product is then cooled, powdered and stirred with double the theoretical quantity of 10% sulphuric acid (calculated on the iron) until hydrogen is no longer evolved. Alternatively, the powdered material can be left overnight in the acid, and stirred for an hour or two in the morning. It is filtered, washed with water and stirred with 10% caustic soda (100 cc.) for half an hour, and filtered. The solid is finally washed with boiling water, warmed with a little alcohol for a few minutes, filtered and dried at 100° C.

Example 4

This describes the production of compounds using magnesium powder.

36 parts of cyanobenzamide and 6 parts of coarse magnesium powder are intimately mixed. The mixture is then heated for three quarters of an hour at a temperature of 220° C. The cool melt is powdered and stirred with 600 parts of 5% sulphuric acid for half an hour. The solid is filtered, washed with water and stirred with 220 c. c. of 5% caustic soda for half an hour. The solid is again filtered, washed with boiling water and dried at 100° C. The yield is 18 parts of a bluish-green powder.

General

The reaction which occurs in the above examples probably takes place in the following manner. The various ortho-aryl-cyanoamides employed apparently initially form a 1-hydroxy-3-midio-isoindole of the probable formula

I

wherein R represents a benzene or naphthalene residue, the two carbon atoms being ortho to each other. The 1-hydroxy-3-imido-isoindole is then apparently dehydrated with intermolecular condensation to yield a substance of the probable formula

II

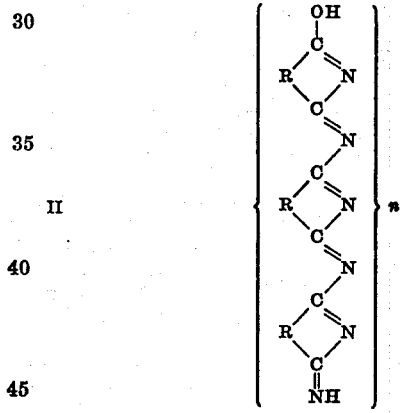

The value of $n$ in this formula has not been definitely established but is probably 4. The dehydration to form the above compound does not occur in the absence of a metal or of a metal compound.

The final dyes produced are in some cases thought to be metallic compounds, the metal being probably fixed to the terminal groups of the above structure by primary valences and (judging from the marked stability of the products) the metal is probably also coordinated with nitrogen to form chelate rings. The metal is fixed, in the presence of a metal, with the elimination of hydrogen. When a sulphide, oxide or a carbonate of a metal is employed, hydrogen sulphide, water and carbon dioxide are evolved, respectively. The metals appear to first catalyze the formation of the above condensation product and to then combine in unknown manner if they are capable of forming chelate rings. The compound II can be obtained free from metal when prepared from magnesium oxide. For example this product, prepared at about 235° C. may be extracted with concentrated sulphuric acid to give a blue-green powder free from magnesium.

Extensive analytical results are in agreement with the above description.

For the purposes of this invention, the following materials may also be used:—Magnesium (235° C.), antimony (265° C.), magnesium oxide (260° C.), litharge (300° C.) ferrous sulphide (235 C.), magnesium oxide in naphthalene (230° C.), magnesium carbonate in naphthalene (235° C.), iron in anthracene (240° C.), the figures in parenthesis following the various materials in each case indicating approximately the temperature at which the reaction should take place. The naphthalene and anthracene mentioned above act merely as diluents in the process. The reaction with iron may be carried out at temperatures ranging from 200° C. to 300° C., and with magnesium at temperatures from 200° C. to 250° C.

As many apparently widely different embodiments of this invention may be made without departing from the spirit and scope thereof, it is to be understood that we do not limit ourselves to the specific embodiments thereof except as defined in the appended patent claims.

We claim:—

1. The process which comprises heating an o-cyano-aryl-amide at a temperature between 200 and 300° C. in the presence of a compound selected from the group consisting of the oxides, sulfides and carbonates of polyvalent metals.

2. The process which comprises heating o-cyano-benzamide at a temperature between 200 and 300° C. in the presence of a compound selected from the group consisting of the oxides, sulfides and carbonates of iron.

3. The process which comprises heating o-cyano-benzamide at a temperature between 200 and 300° C. in the presence of a compound selected from the group consisting of the oxides, sulfides and carbonates of magnesium.

JOCELYN FIELD THORPE.
REGINALD PATRICK LINSTEAD.
JOHN THOMAS.

CERTIFICATE OF CORRECTION.

Patent No. 2,025,791.                                    December 31, 1935.

JOCELYN FIELD THORPE, ET AL.

It is hereby certified that error appears in the printed specification of the above numbered patent requiring correction as follows: Page 2, first column, line 15, for "3-midio-isoindole" read 3-imido-isoindole; and that the said Letters Patent should be read with these corrections therein that the same may conform to the record of the case in the Patent Office.

Signed and sealed this 3rd day of March, A. D. 1936.

Leslie Frazer (Seal)                          Acting Commissioner of Patents.

CERTIFICATE OF CORRECTION.

Patent No. 2,025,791. December 31, 1935.

JOCELYN FIELD THORPE, ET AL.

It is hereby certified that error appears in the printed specification of the above numbered patent requiring correction as follows: Page 1, second column, lines 10 and 12, for "phthalimide" read phthalamide; and that the said Letters Patent should be read with this correction therein that the same may conform to the record of the case in the Patent Office.

Signed and sealed this 5th day of May, A. D. 1936.

Leslie Frazer (Seal) Acting Commissioner of Patents.